United States Patent [19]
Sekiguchi

[11] Patent Number: 5,857,334
[45] Date of Patent: Jan. 12, 1999

[54] VEHICLE BRAKE BOOSTER

[75] Inventor: Akihiko Sekiguchi, Saitama, Japan

[73] Assignee: Akebono Brake Industry Co., Ltd., Tokyo, Japan

[21] Appl. No.: 886,926

[22] Filed: Jul. 2, 1997

[30] Foreign Application Priority Data

Jul. 2, 1996 [JP] Japan ................... 8-171971

[51] Int. Cl.⁶ .................................................. B60T 13/00
[52] U.S. Cl. ............................. 60/547.1; 60/581; 60/591
[58] Field of Search .................... 60/533, 597.1, 60/598, 581, 591

[56] References Cited

U.S. PATENT DOCUMENTS

| | | | |
|---|---|---|---|
| 3,978,667 | 9/1976 | Ohara | 60/547.1 X |
| 4,986,613 | 1/1991 | Nishii et al. | 60/547.1 X |
| 5,010,732 | 4/1991 | Yagi | 60/547.1 X |
| 5,013,094 | 5/1991 | Nishii et al. | 60/547.1 X |
| 5,090,293 | 2/1992 | Winterlik | 60/547.1 X |

*Primary Examiner*—Hoang Nguyen
*Attorney, Agent, or Firm*—Morgan, Lewis & Bockius LLP

[57] ABSTRACT

A vehicle brake booster comprises: a body having an input port, an output port, and a flow path through which the input port is communicated with the output port; a first piston which is arranged in the flow path, and on which the hydraulic pressure in the flow path acts; a control valve which is abutted against the first piston, and defines a control chamber which is able to introduce or block the hydraulic pressure of an accumulator; a second piston which is arranged downstream of the first piston in the flow path, the second piston being in the form of a stepped piston having a large diameter portion and a small-diameter portion to the end of which the hydraulic pressure in the flow path is applied, and being able to produce a wheel cylinder pressure; a hydraulic pressure chamber formed in the large-diameter portion of the second piston; and a cut valve arranged downstream of the second piston in the flow path.

11 Claims, 5 Drawing Sheets

AT NON-OPERATION

AT NON-OPERATION

AT OPERATION

AT MAINTENANCE

AT REDUCTION

VEHICLE BRAKE BOOSTER

BACKGROUND OF THE INVENTION

1. Field of the Invention

This invention relates to a vehicle brake booster, and more particularly to a hydraulic type vehicle brake booster which can be installed at a desired point of a pipe which connecting a master cylinder to a wheel cylinder.

2. Description of the Related Art

A hydraulic vehicle brake booster system has been well known in the conventional art, as a mechanism for increasing the force of depression applied to a brake pedal.

The conventional vehicle brake booster system comprises; an accumulator which stores a brake fluid discharged from a pump; a hydraulic booster which performs a boosting action with the hydraulic pressure supplied from the accumulator in response to an operation of the brake pedal; a master cylinder to which the pressurized fluid which has been boosted by the hydraulic booster is transmitted; and a wheel cylinder (wheel cylinders) to which the hydraulic pressure of the master cylinder is transmitted to perform a braking action. An electro-magnetic control valve which is opened and closed by an operation of the ignition switch, is provided between the accumulator and the hydraulic booster. That is, when the ignition switch is turned on, the electromagnetic control valve is opened so that the accumulator is communicated with the hydraulic booster; and when the ignition switched is turned off, the electromagnetic control valve is closed so that the accumulator is disconnected from the hydraulic booster. Hence, even in the case where the vehicle is held stopped for a long period of time although internal leakage occurs with the control valve provided in the hydraulic booster, the hydraulic pressure of the accumulator will never drop, being held at a predetermined value. That is, the risk is eliminated that the hydraulic booster cannot perform the boosting action.

However, presently used vehicle brake booster system including the above-described hydraulic vehicle brake booster suffer from the following risk: That is, the vehicle brake booster is coupled directly to the master cylinder, and therefore the distance between the vehicle brake booster mounting surface and the end of the master cylinder is long. Hence, the vehicle brake booster is low in the degree of freedom of installation.

SUMMARY OF THE INVENTION

In view of the foregoing an object of the invention is to eliminate the above-described risk accompanying a conventional vehicle brake booster system. More specifically, an object of the invention is to provide a hydraulic vehicle brake booster of an individual component which can be installed at any point on a pipe connecting the master cylinder to the wheel cylinder, thus being high in the degree of freedom of installation.

According to the invention, the vehicle brake booster can be installed at any point on the pipe connected between the master cylinder and the wheel cylinder. This feature makes It possible to reduce the volume of the junction of the master cylinder and the brake pedal. The installation of the vehicle brake booster can be achieved by the utilization of the space in the engine room or any suitable space in the vehicle body; that is, the vehicle brake booster is greatly improved in the degree of freedom in the selection of a installation place. Furthermore, since it can be installed on the pipe laid between the master cylinder and the wheel cylinder, it can be installed after the vehicle body has been assembled. That is, the vehicle brake booster can be applied to all kinds of vehicles, thus being high in applicability.

According to the present invention, there is provided a vehicle brake booster comprising: a body having an input port, an output port, and a flow path through which the input port is communicated with the output port; a first piston being arranged in the flow path, a hydraulic pressure in the flow path acting on the first piston; a control valve being abutted against the first piston, and defining a control chamber to which a pressurized fluid of an accumulator can be introduced or blocked; a second piston being arranged downstream of the first piston in the flow path, the second piston being in a form of a stepped piston having a large-diameter portion and a small-diameter portion wherein the hydraulic pressure in the flow path is applied to an end of the small-diameter portion, and the second piston is able to produce a wheel cylinder pressure; a hydraulic pressure chamber in which the large-diameter portion of the second piston is accommodated; and a cut valve being arranged downstream of the second piston in the flow path; wherein (i) when the hydraulic pressure in the flow path is increased, the first piston moves the control valve to introduce the accumulator pressure into the control chamber to produce a new hydraulic pressure in proportion to the hydraulic pressure in the flow path, and apply the new hydraulic pressure to the hydraulic pressure chamber to perform a boosting action, and (ii) when the hydraulic pressure in the flow path is decreased, the first piston moves the control valve to allow the control chamber to communicate with a reservoir, and the cut valve is able to block the flow path with an aid of the new hydraulic pressure applied to the hydraulic pressure chamber of the second piston.

DETAILED DESCRIPTION OF THE PREFERRED EMBODIMENT

Figure 1:
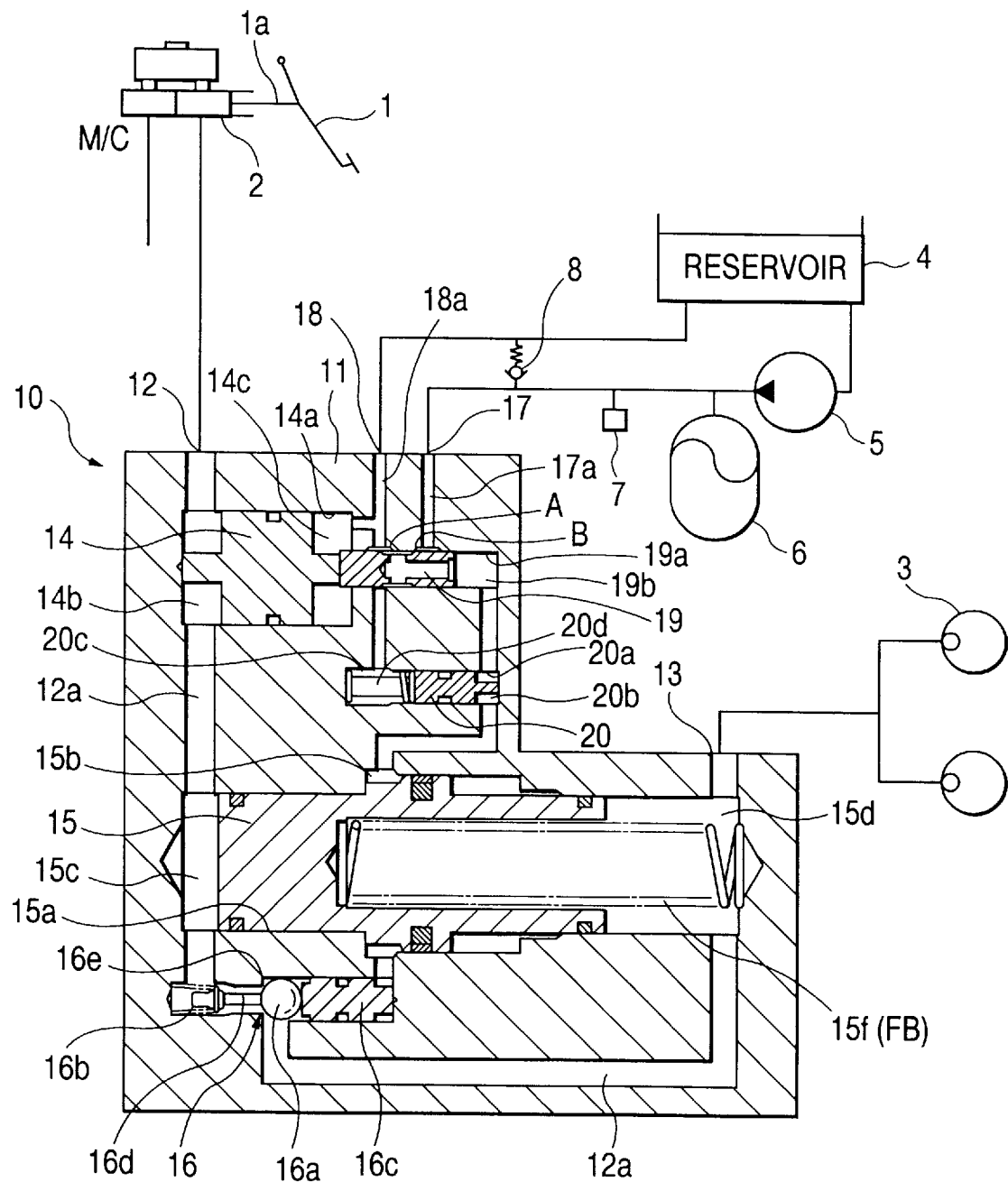
FIG. 1 is a diagram, partly as a sectional diagram, indicating a piping arrangement of a vehicle brake booster, an embodiment of the invention, which is not in operation.
Figure 2:
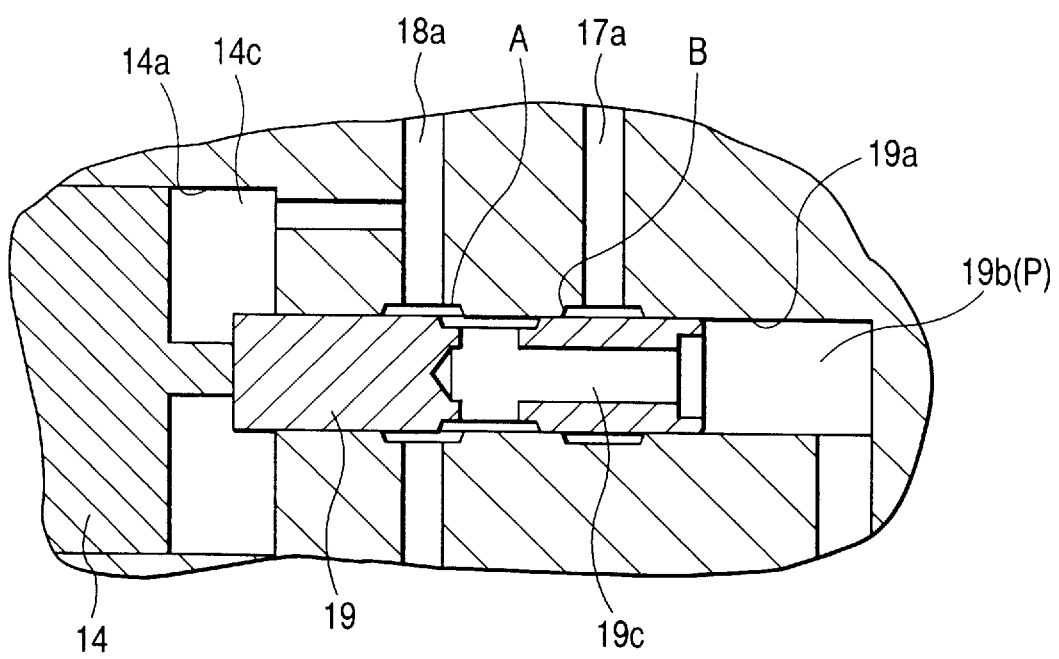
FIG. 2 is an enlarged diagram of a control valve.

A preferred embodiment of the invention will be described with reference to the accompanying drawings. FIG. 1 is a diagram indicating the arrangement, partly as a sectional diagram, of a vehicle brake booster, the embodiment of the is invention, which is not in operation. FIG. 2 is an enlarged diagram of a control valve in the vehicle brake booster.

In FIG. 1, reference numeral 1 designates a brake pedal, which is coupled through a push rod 1a to a master cylinder 2. A hydraulic pressure chamber, on one side, of the master cylinder is connected to wheel cylinder 3 through a vehicle brake booster 10 (described later) which is the embodiment of the invention. Further in FIG. 1, reference numeral 4 designates a reservoir; 5, a pump; 6, an accumulator; 7, a pressure switch; and 8, a relief valve. The pressure in the accumulator 6 is monitored by the pressure switch 7 at all times. That is, when the pressure in the accumulator 6 decreases, then the pump 5 is operated to supply the brake fluid into the accumulator 6; and when the pressure of the accumulator exceed a predetermined valve for some reason, the pressure is released through the relief valve, thereby to protect the whole system. Thus, the hydraulic pressure is maintained in the accumulator 6 at all times which is high enough to operate the vehicle brake booster 10 (described later).

The vehicle brake booster 10 is so designed that it utilizes the hydraulic pressure of the accumulator 6 in which the brake fluid discharged from the pump 5 is stored, thereby to perform the boosting action. As is apparent from FIG. 1, the vehicle brake booster 10 is an individual component which can be installed at any point on the pipe connecting the master cylinder 2 to the wheel cylinder 3.

The structure of the vehicle brake booster 10 will be described in detail.

The vehicle brake booster 10 has a body 11 having an input port 12 and an output port 13. The input port 12 is connected to the hydraulic pressure chamber of the master cylinder 2, while the output port 13 is connected to the wheel cylinder 3. In the body 11, a flow path 12*a* is formed which communicates the input port 12 with the output port 13. In the flow path 12*a*, a first piston 14, a second piston 15, and a cut valve 16 are arranged as shown in FIG. 1.

In addition to the above-described flow path 12*a* the body 11 has a lead-in port 17 and a lead-in flow path 17*a* which are adapted to lead the hydraulic pressure from the accumulator 6 into the body 11; and a lead-out port 18 and a lead-out flow path 18*a* which are adapted to return the fluid into the reservoir 4 which has been led in the body 11. A control valve 19 (described later) is laid over the lead-in flow path 17*a* and the lead-out flow path 18*a*.

The first piston 14 is arranged in fluid-tight in a cylinder 14*a* formed in the body 11, and it divides the inside of the cylinder 14*a* into two parts, a first chamber 14*b* and a second chamber 14*c*. The first chamber 14*b* is communicated with the input port 12, and a chamber 15*c* (described later) defined by the second piston 15. The second chamber 14*c* is communicated with the lead-out flow path 18*a*, and a cylinder 19*a* which is formed for the control valve 19 in such a manner that the it is continuous to the second liquid chamber 14*c*.

In the cylinder 19*a*, the control valve 19 is arranged in fluid-tight which connects the lead-in flow path 17*a* to the lead-out flow path 18*a* and disconnects the former 17*a* from the as latter 18*a*. The control valve 19 is normally in contact with the first piston 14 as shown, so that, as the first piston 14 moves, the control valve 19 is also moved. In the embodiment, the piston 14 has a protrusion which is brought into contact with the control valve 19; however, it is not always necessary for the first piston 14 to have the protrusion; that is, the first piston 14 may be so designed that it is directly brought into contact with the control valve 19.

The control valve 19, as shown in the enlarged diagram of FIG. 2, has a flow path 19*c* in its body, and defines a control chamber 19*b* in the cylinder 19*a*. The control valve 19, as shown in FIG. 2, forms a valve B in the lead-in flow path 17*a*, and a valve A in the lead-out flow path 18*a*. With the control valve 19 in non-operation state as shown in FIGS. 1 and 2, the valve A is opened while the valve B is closed; and when it is in operation state (when it performs the boosting operation) (described later), the valve A is closed while the valve B is opened.

That is, when the control valve 19 is in non-operation state, the lead-out flow path 18*a* is communicated through the flow path 19*c* with the control chamber 19*b*, while the lead-in flow path 17*a* is not communicated with the control chamber 19*b*. When the first piston 14 as shown in FIGS. 1 and 2 is moved to the right, the control valve 19 is also moved to the right, so that the lead-out flow path 18*a* is not communicated with the control chamber 19*b* while the lead-in flow path 17*a* is communicated with the control chamber 19*b*. And the accumulator pressure applied to the control chamber 19*b* is utilized to operate the second piston 15 (described later) to perform the boosting operation. In this case, the pressure P in the control chamber 19*b* is as follows (described later in detail);

$$P = (A/S) \times Pm$$

where Pm is the master cylinder pressure, A is the sectional area of the first piston, and S is the sectional area of the control valve.

In FIG. 1, the control chamber 19*b* of the control valve 19 is communicated with a fluid absorbing chamber 20*b* which is defined by a third piston 20 (described later in detail). The cylinder 19*a* of the control valve 19 is communicated with the spring accommodating chamber 20*d* of the third piston 20.

The third piston 20 is arranged in fluid-tight in a cylinder 20*a* which is formed for the third piston 20 in such a manner that the third piston 20 is freely movable. The cylinder 20*a* includes the fluid absorbing chamber 20 and the spring accommodating chamber 20*d*. The third piston 20 is urged by the spring 20*c* in the spring accommodating chamber 20*d* towards the fluid absorbing chamber 20*b* at all times. The fluid absorbing chamber 20*b* of the third piston 20 is communicated with the control chamber 19*b* of the control valve 19 as was described above, and communicated with a hydraulic chamber 15*b* which is defined by the second piston 15. The spring accommodating chamber 20*d* is communicated with the cylinder 19*a* of the control valve 19. In the above-described embodiment, the spring accommodating chamber 20*d* is communicated through the cylinder 19*a* with the reservoir 4; however, it may be communicated directly with the latter 4.

In the initial period of the braking operation, the third piston 20 functions as follows: That is, in order to prevent the generation of a high pressure in the control chamber 19*b* for the period of time which elapses from the time instant that the valve A of the control valve 19 is closed until the valve B is opened, the third piston 20 is moved against the elastic force of the spring 20*c*, so that the fluid in the control chamber 19*b* is absorbed into the fluid absorbing chamber 20*b*. In other words, the third piston 20 is so provided as to smoothly move the control valve at the initial time of the braking operation. Hence, the spring 20*c* may be low in elasticity.

The second piston is a two-step piston comprising a large-diameter portion and a small-diameter portion, and it is provided in fluid-tight in the two-step cylinder 15*a* which is formed in the body 11 in such a manner that it is freely movable therein. The small-diameter cylinder includes a chamber 15*c*, while the large-diameter cylinder includes a chamber 15*b*, and a spring accommodating chamber 15*d* is defined by the second piston 15 and the body. The second piston 15, when not in operation, is maintained urged by a spring 15*f* as shown in FIG. 1 at all times. The spring accommodating chamber 15*d* is communicated with the output port 13.

The aforementioned cut valve 16 comprises a ball 16a, a spring 16b, a piston 16c, and a locking rod 16d. When the cut valve is not in operations the ball 16a is spaced from a valve seat 16e with the aid of the locking rod 16d, so that the fluid chamber 15c of the second piston 15 is communicated with the spring accommodating chamber 15d. When the pressure of the hydraulic pressure chamber 15b of the second piston is applied to the piston 16c, the latter 16c is moved to the left in FIG. 1; that is, the ball 16a is brought into contact with the valve seat 16e to interrupt the communication between the fluid chamber 15c of the second piston and the spring accommodating chamber 15d. In other words, the cut valve 16 has a function that, when placed in operating state, it interrupts the communication between the input port 12 and the output port 13. Furthermore, when the accumulator system becomes out of order, the pressure of the hydraulic pressure chamber 15b is decreased, and therefore the piston 16c is returned as shown in FIG. 1, to immediately open the flow path between the master cylinder and the wheel cylinder, thereby to supply the liquid pressure of the master cylinder directly to the wheel cylinder. Thus, the cut valve 16 ensures the safety when the accumulator system becomes out of order. On the other hand, when, although the accumulator system is normal, the brake does not work, the pressure of the hydraulic pressure chamber 15b is decreased, so that the piston 16c is returned as shown in FIG. 1, to immediately open the flow path between the master cylinder and the wheel cylinder so that no pressure remains in the wheel cylinder.

The operation of the vehicle brake booster 10 thus organized will be described.

[At the Non-Operation]

When the operator does not depress the brake pedal 1; that is, when the master cylinder generates no pressure, no liquid pressure is applied to the first and second pistons 14 and 15. Therefore, as shown in FIG. 2, with the control valve 19, the valve A is opened and the valve B is closed, so that the pressure from the accumulator 6 is blocked by the valve B, and the control chamber 19b of the control valve 19 is communicated with the reservoir 4. Hence, the pressure of the control fluid chamber 19b is zero, the pressure of the fluid absorbing chamber 20b of the third piston 15 is zero, too, and the pressure of the hydraulic fluid chamber 15b of the second piston 15 is zero, too. Accordingly, no pressure acts on the piston 16c of the cut valve 16; that is, the cut valve 16 is held as shown in FIG. 1, opening the flow path. Hence, the master cylinder, the first hydraulic chamber 14b of the first piston, the chamber 15c of the second piston, the opened cut valve, the spring accommodating chamber 15d of the second pistons the output port 13, and the wheel cylinder are communicated with one another, in the stated order.

[At the Operation]

When the operator depresses the brake pedal 1; that is, when the master cylinder generate a hydraulic pressure, the pressure thus generated acts on the first and second pistons 14 and 15. The first piston 14, by the pressure, is moved to the right in FIG. 1, and the control valve 19 is also moved to the right in FIG. 1 to close the valve A. When the liquid pressure acting on the first piston 14 is slightly, increased, the pressure is generated in the control chamber 19b in the area ratio of the first piston 14 to the control valve 19. When the pressure thus generated reaches the fixed value which is determined by the spring 20c acting on the third piston 20, the first piston 14 and the control valve 19 are further moved to the right, so that the valve A is closed, while the valve B is opened. Hence, the pressure from the accumulator 6 is applied through the valve B to the control chamber 19b. Accordingly, until the valve B of the control valve 19 is opened, the accumulator pressure is not applied to the control chamber 19b and therefore the cut valve 16 is maintained open, and the pressure in the spring accommodating chamber 15d of the second piston 15 (i.e., the pressure in the wheel cylinder 3) is equal to the pressure of the master cylinder.

When the pressure in the first chamber 14b of the first piston 14 is further slightly increased, the pressure of the control chamber 19b is increased, so that the piston 16c of the cut valve 16 is moved to the left against the elastic force of the spring 16b until the ball 16a abuts against thereby to close the cut valve 16. Thus, the chamber 15c of the second piston 15 is separated from the spring accommodating chamber 15d (i.e., the master cylinder is isolated from the wheel cylinder. In the above-described operation, the pressure of the first chamber 14b is extremely low, 0.1 Mpa or less.

Figure 3:
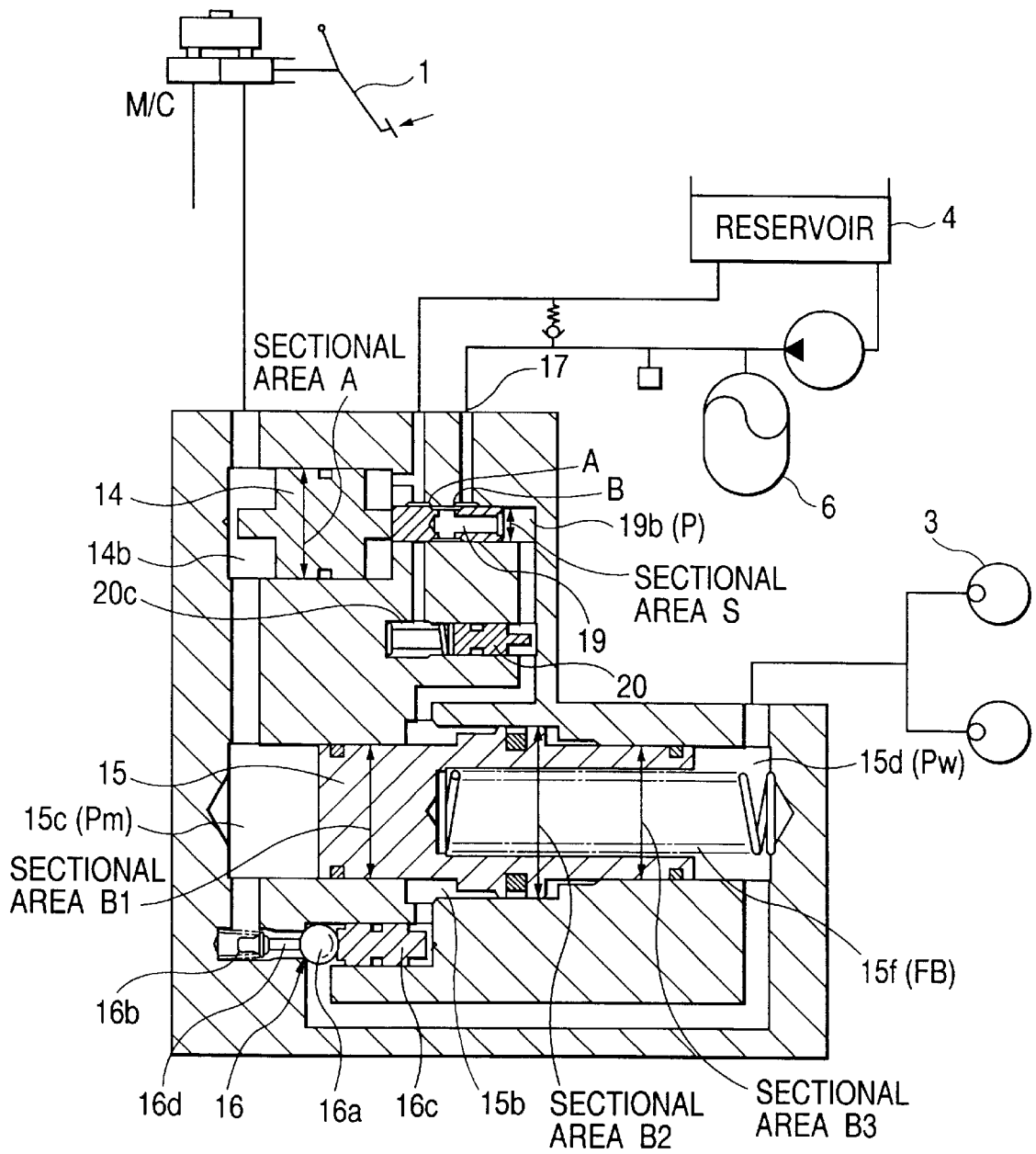
FIG. 3 is a diagram, partly as a sectional diagram; indicating the piping arrangement of the vehicle brake booster when pressurized.
Figure 4:
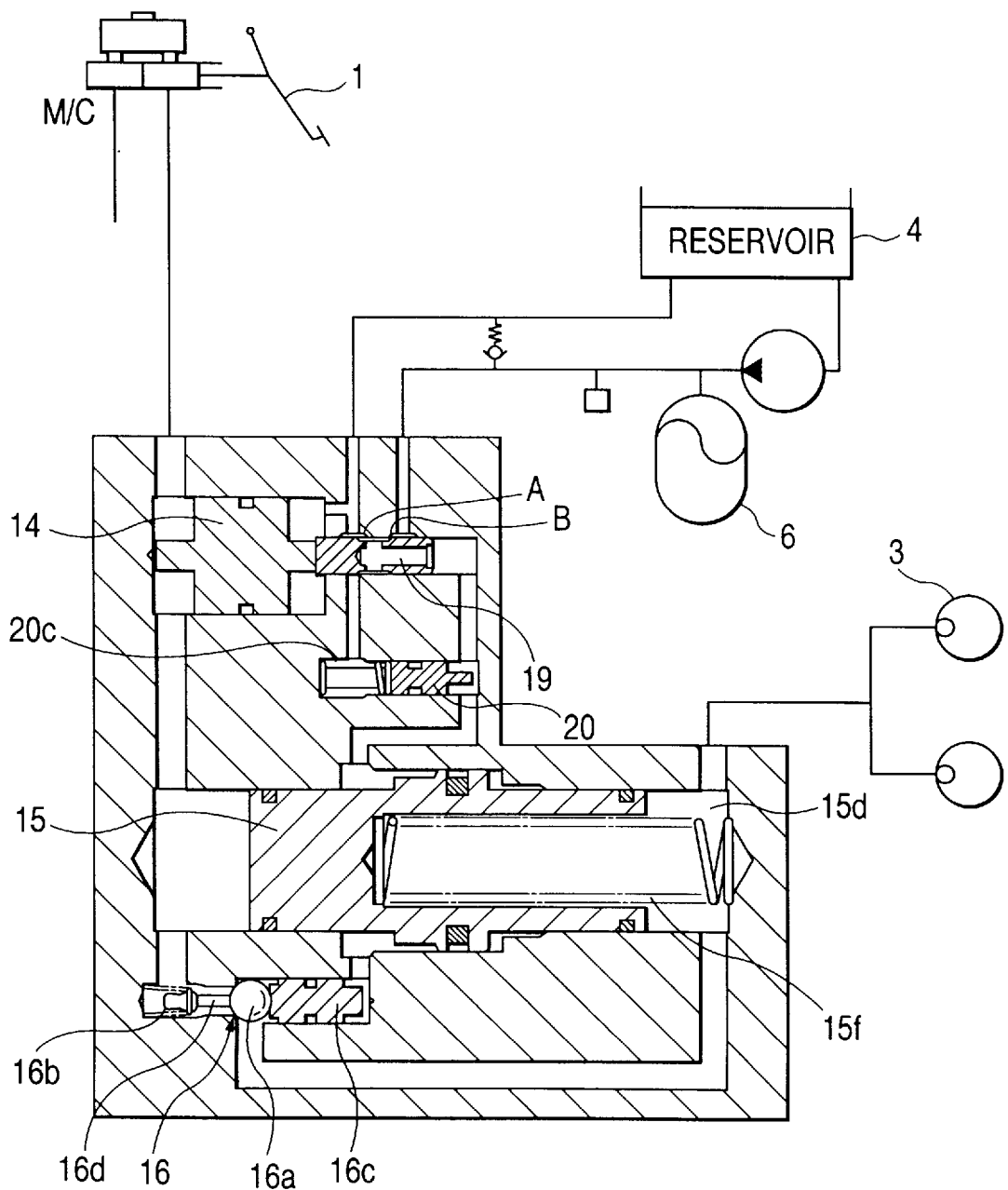
FIG. 4 is a diagram, partly as a sectional diagram indicating the piping arrangement of the vehicle brake booster when the pressure is maintained applied thereto.

The liquid pressure balance in this case will be described with reference to FIG. 3 indicating a state of the vehicle brake booster with the brake pedal depressed.

It is assumed that

A is the sectional area of the first piston,

S is the sectional area of the control valve

B1 is the sectional area of the small-diameter portion of the second piston 15,

B2 is the sectional area of the large-diameter portion of the second piston 15,

B3 is the sectional area of the spring accommodating section of the second piston 15, FB is the elastic force of the spring of the second piston, Pm is the pressure of the chamber 15c of the second piston 15 (i.e., the pressure of the master cylinder), P is the pressure of the control chamber 19b of the control valve 19, and Pw is the pressure of the spring accommodating chamber 15d of the second piston 15 (i.e., the liquid pressure of the wheel cylinder).

In the case of the control valve 19, the balance relation between the pressure P of the control chamber 19b and the pressure Pm of the master cylinder is as follows:

$$Pm \times A = P \times S \tag{1}$$

Therefore, $$P = (A/S) \times Pm \tag{2}$$

In the case of the second piston 15, the relation between the pressure Pm of the chamber 15c (the pressure of the roaster cylinder) and the pressure Pw of the spring accommodating chamber 15d (the pressure of wheel cylinder(s)) is as follows:

$$Pm\ B1 + (B2 - B1) \times P = FB + Pw \times B3 \tag{3}$$

when Equation (2) is substituted in Equation (3), then $$Pw = [(B1 + (B2 - B1) \times (A/S) \times Pm - FB]/B3 \tag{4}$$

As is apparent from Equation (4), the pressure Pw of the wheel cylinder is increased in proportion to the ratio of the sectional area A of the first piston 14 and the difference between the sectional area B1 of the small-diameter portion of the second piston 15 and the sectional area B2 of the large-diameter portion of the first piston 15. Hence, by increasing the sectional area A of the first piston 14 in comparison with the sectional area S of the control valve 19, and by increasing the difference (B2–B1) between the large-diameter portion and the small-diameter portion of the second piston, the boosting effect is increased.

Thereafter, when the pressure of the master cylinder is further increased, while the balance of Equation 4 is maintained under the relation between the first piston 14 and the control valve 19, the pressure of the control chamber 19*b* is increased in proportion to the master cylinder pressure, thus acting on the pressure chamber 15*b*. On the other hand, since the pressure of the chamber 15*c* on which the master cylinder acts directly is also increased, the second piston is compresses the spring 15*f* to move to the right in FIG. 3, thereby to pressurize the spring accommodating chamber 15*d* (i.e., the wheel cylinder). Thus, the second piston 15 is moved to pressurize the wheel cylinder while performing the boosting action.

[At the Maintenance of the Brake Pressure]

When the brake pedal is maintained depressed by the operator, i.e., when the wheel cylinder pressure is maintained, the above-described balance of Equation 4 is held, so that as shown in FIG, 4 the valves A and B of the control valve 19 are closed. Therefore, the second piston 15 will not move, and the pressure of the spring accommodating chamber 15*d* of the second piston (i.e., the pressure in the wheel cylinder) is maintained unchanged. In this case, the cut valve 16 is held closed by the pressure of the control chamber 19*b*.

[At the Reduction of the Brake Pressure]

Figure 5:
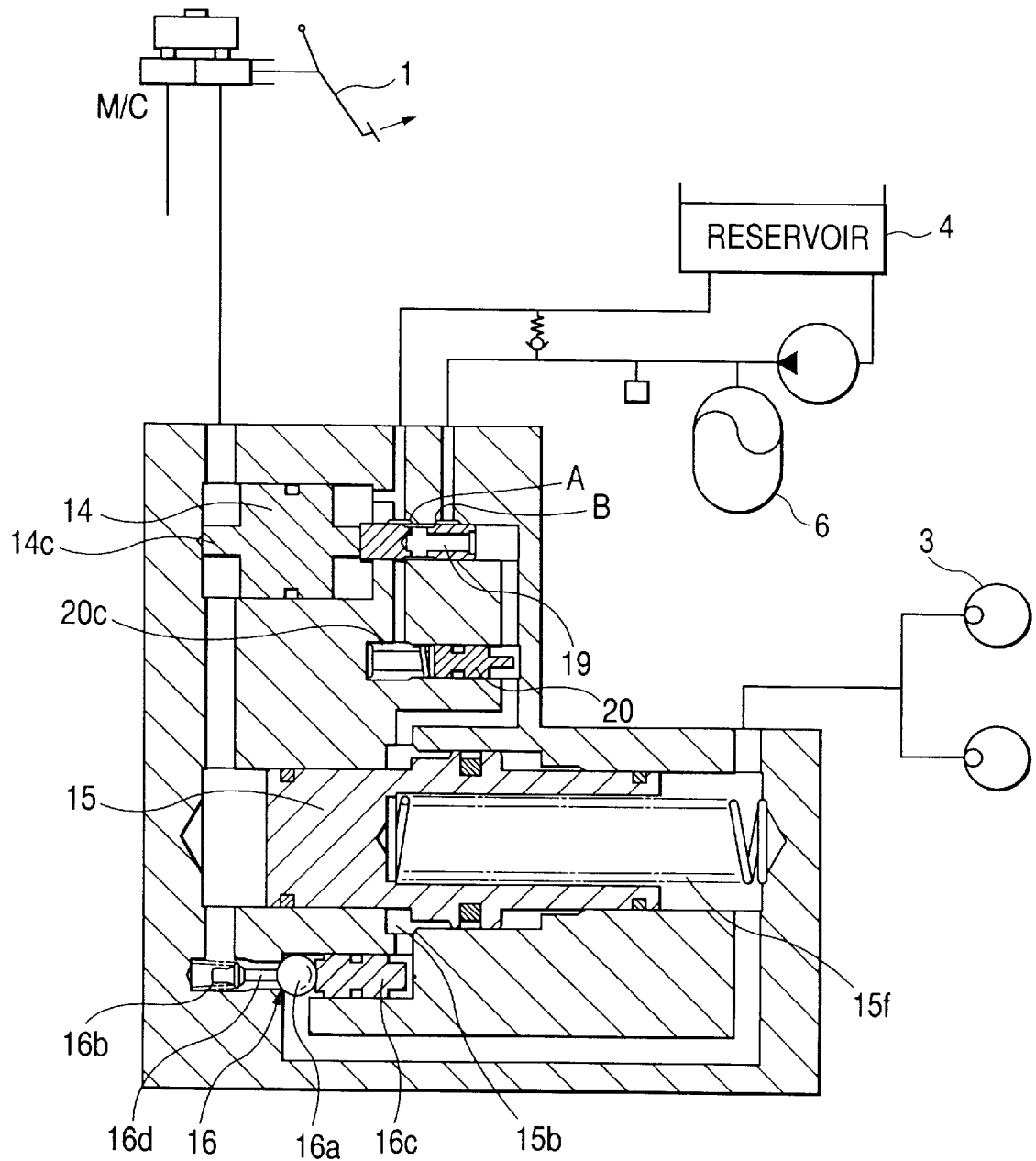
FIG. 5 is also a diagram, partly as a sectional diagram indicating the piping arrangement of the vehicle brake booster when the pressure is decreased.

When the operator is releasing the brake pedal, the pressure acting on the first piston 14 is decreased. Hence, in this case, the first piston 14 is as shown in FIG. 5, so that the valve A of the control valve 19 is opened while the valve B is closed. And the pressure of the control chamber 19*b* of the control valve 19 is applied through the valve A to the reservoir 4. In addition, the pressure of the pressure chamber 15*b* of the second piston is also decreased, so that the second piston 15 is moved to the left in FIG. 5, while the spring accommodating chamber is increased in volume, so that the pressure of the wheel cylinder is decreased. In this case, the cut valve 16 is maintained closed until the pressure of the control chamber 19*b* decreases to a predetermined value.

As is apparent from the above description, the vehicle brake booster which utilizes the pressure of the accumulator to perform the boosting operation, is provided as an individual component. Hence, it can be installed at a desired point on the pipe between the master cylinder and the wheel cylinder. The space in the engine room can be effectively utilized for the installation of the vehicle brake booster.

The above-described vehicle brake booster of the invention has the following effects or merits:

(1) In the vehicle brake booster of the invention, the pistons and the cut valve for performing the boosting action are accommodated in the booster body. Hence, the vehicle brake booster can be handled as one complete component.

(2) The vehicle brake booster can be installed at a desired point on the pipe laid between the master cylinder and the wheel cylinder(s). The junction of the master cylinder and the brake pedal can be decreased in volume.

(3) The vehicle brake booster can be installed not only in the space in the engine room, but also in a desired spaced in the vehicle body. This means that the vehicle brake booster is considerably high in the degree of freedom of the selection of installation position.

(4) Since it can be installed on the pipe laid between the master cylinder and the wheel cylinder(s), it can be installed after the vehicle body has been assembled. That is, the vehicle brake booster can be applied to all kinds of vehicles.

(5) The vehicle brake booster is considerably high in safety, because the cut valve acting at the time of failure is provided in the vehicle brake booster.

(6) In order to smoothly move the control valve, the third piston is provided in the vehicle brake booster. Hence, the vehicle brake booster is high in reactivity.

(7) The master cylinder pressure can be increased according to the ratio (A/S) of the sectional area A of the first piston in the booster to the sectional area B of the control valve. Hence, the boosting effect can be freely changed depending on the ratio (A/S).

What is claimed is:

1. A vehicle brake booster comprising:

a body having an input port, an output port, and a flow path through which the input port communicates with the output port;

a first piston in the flow path with a hydraulic pressure in the flow path acting on the first piston;

a control valve abutting against the first piston, and defining a control chamber into which a pressurized fluid from an accumulator can be introduced;

a second piston downstream of the first piston in the flow path, the second piston shaped as a stepped piston having a large-diameter portion and a small-diameter portion, wherein the hydraulic pressure in the flow path is applied to an end of the small-diameter portion, and the second piston produces a wheel cylinder pressure;

a hydraulic pressure chamber accommodating the large-diameter portion of the second piston; and a cut valve downstream of the second piston in the flow path, and connected to the hydraulic pressure chamber through a conduit, wherein when the hydraulic pressure in the flow path increases, the first piston moves the control valve to introduce the pressurized fluid from the accumulator into the control chamber to produce a second pressure in proportion to the hydraulic pressure in the flow path, and to add the second pressure to the hydraulic pressure chamber to perform a boosting action, and when the hydraulic pressure in the flow path decreases, the first piston moves the control valve to allow the control chamber to communicate with a reservoir, and wherein the cut valve blocks the flow path in response to the second pressure applied to the hydraulic pressure chamber of the second piston.

2. The vehicle brake booster according to claim 1, wherein the second pressure proportional to the hydraulic pressure in the flow path is a pressure obtained by increasing a master cylinder pressure in a ratio of a sectional area of the first piston to a sectional area of the control valve.

3. The vehicle brake booster according to claim 1, wherein when no liquid pressure acts on the hydraulic pressure chamber, the cut valve allows a communication between the input port with the output port, and when the liquid pressure acts on the hydraulic pressure chamber, the cut valve interrupts the communication between the input port and the output port.

4. The vehicle brake booster according to claim 2, wherein when no hydraulic pressure acts on the hydraulic pressure chamber, the cut valve allows a communication between the input port and the output port, and when the hydraulic pressure acts on the hydraulic pressure chamber, the cut valve interrupts the communication between the input port and the output port.

5. The vehicle brake booster according to claim 1, further comprising a third piston and a fluid absorbing chamber defined by the third piston and communicating with the control chamber.

6. The vehicle brake booster according to claim 2, further comprising a third piston and a fluid absorbing chamber defined by the third piston and communicating with the control chamber.

7. The vehicle brake booster according to claim 3, further comprising a third piston and a fluid absorbing chamber defined by the third piston and communicating with the control chamber.

8. The vehicle brake booster according to claim 4, farther comprising a third piston and a fluid absorbing chamber defined by the third piston and communicating with the control chamber.

9. A brake booster comprising:

a housing having a flow path connecting an input port with an output port;

a first piston in the flow path;

a control valve abutting against the first piston and defining a control chamber;

an accumulator connected to the control chamber and injecting pressurized fluid into the control chamber;

a reservoir connected to the control chamber;

a second piston downstream of the first piston in the flow path and outputting a pressure output to a wheel cylinder, the second piston having a small diameter end in the flow path and a large diameter end in a hydraulic pressure chamber;

a cut valve downstream of the second piston in the flow path and connected to the hydraulic pressure chamber, wherein an increase in a hydraulic pressure in the flow path moves the control valve and introduces fluid from the accumulator into the control chamber, wherein the hydraulic pressure in the flow path increases in proportion to a pressure in the control chamber, wherein a decrease in the hydraulic pressure in the flow path moves the control valve to allow the control chamber to communicate with the reservoir, and wherein the cut valve blocks the flow path in response to an increase in a hydraulic pressure in the hydraulic pressure chamber.

10. The brake booster of claim 9, wherein the cut valve includes a ball for blocking the flow path in response to the hydraulic pressure in the hydraulic pressure chamber.

11. The brake booster of claim 9, further including:

a third piston; and a fluid absorbing chamber defined by the third piston and communicating with the control chamber.

* * * * *